Patented July 12, 1938

2,123,251

UNITED STATES PATENT OFFICE 2,123,251

VAT DYESTUFFS OF THE PYRAZINE SERIES

Heinrich Neresheimer and Wilhelm Ruppel, Ludwigshafen-on-the-Rhine, and Willy Eichholz, Mannheim, Germany, assignors to General Aniline Works, Inc., New York, N. Y., a corporation of Delaware No Drawing. Application February 17, 1937, Serial No. 126,252. In Germany February 21, 1936

10 Claims. (Cl. 260—29)

The present invention relates to vat dyestuffs of the pyrazine series.

We have found that valuable new vat dyestuffs are obtained by causing organic amino compounds to act on Pz-dihydroxyquinoxalines or Pz-halogenhydroxyquinoxalines, the initial materials being chosen so that at least one of them is capable of being vatted.

The dyestuffs thus obtainable correspond to the general formula

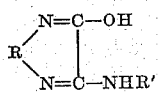

wherein R represents the radical of an aromatic compound combined in two adjacent positions with the nitrogen atoms of the pyrazino ring shown, and R' an organic radical at least one of the radicals R and R' being capable of being vatted. They may be, for example, radicals of the anthraquinone, anthrapyrimidine, dibenzanthrone, isodibenzanthrone, anthraquinonebenzacridone or anthraquinonethioxanthone series. Besides, the radical R' may belong to the benzene, naphthalene, anthracene, phenanthrene or benzanthrone series. These radicals may contain any substituents, for example alkyl groups such as methyl, ethyl or butyl groups, or halogen atoms (chlorine, bromine, or fluorine) which may also stand in a side-chain as for example radicals —CF₃.

For example, by the reaction of Pz-chlor-hydroxy-1.2-pyrazinoanthraquinone (7.8-phthaloyl-2.3-chlorhydroxyquinoxaline) obtainable for example by the treatment of Pz-dihydroxy-1.2-pyrazinoanthraquinone (7.8-phthaloyl-2.3-dihydroxyquinoxaline) with phosphorus oxychloride with any amino compounds there are formed vat dyestuffs giving yellow to blue dyeings, usually of very good fastness.

Instead of Pz-chlorhydroxy-1.2-pyrazinoanthraquinone, Pz-dihydroxy-1.2-pyrazinoanthraquinone may be caused to react with amino compounds. It is then advantageous to add condensing agents, such as zinc chloride, boric acid, sodium bisulphate, or anhydrous copper sulphate. The dyestuffs thus obtainable usually agree with the dyestuffs prepared from Pz-chlorhydroxy-pyrazinoanthraquinone and the same amino compounds.

Similar dyestuffs are obtained by the reaction of Pz-dihydroxyquinoxaline or Pz-chlorhydroxyquinoxaline with amino-anthraquinones or other amino compounds capable of being vatted.

The following examples will further illustrate how the said invention may be carried out in practice but the invention is not restricted to these examples. The parts are by weight.

Example 1

A mixture of 6 parts of Pz-chlorhydroxy-1.2-pyrazinoanthraquinone (obtainable by heating dihydroxy-1.2-pyrazinoanthraquinone with phosphorus oxychloride in the presence of nitrobenzene and forming yellow-brown needles having a melting point of 268° C.), 2 parts of aniline and 60 parts of nitrobenzene is heated to boiling for an hour. The new dyestuff thereby separates with the evolution of hydrogen chloride. It is filtered off by suction at about 100° C. and washed with nitrobenzene and alcohol. After drying it is a brown powder which crystallizes from nitrobenzene in compact red-brown needles. According to analysis it has been formed by the reaction of one molecule of Pz-chlorhydroxy-1.2-pyrazinoanthraquinone with one molecule of aniline with the splitting off of one molecule of hydrogen chloride. It dyes cotton brown-red shades having good properties as regards fastness.

When instead of aniline, other organic amino compounds are used, the reaction conditions being capable of variation within wide limits as regards temperature, the nature and amount of solvent and the duration of the reaction, correspondingly constituted dyestuffs are obtained the main properties of which are given in the following list:

| No. | Amino compound employed | Color and shape of crystallized dyestuff | Color of dyeing |
|---|---|---|---|
| 1 | Methylamine | Orange-red needles | Salmon color. |
| 2 | Ethylene diamine | Orange-brown needles | Brown-orange. |
| 3 | Ortho-toluidine | Yellow-brown needles | Orange. |
| 4 | Meta-toluidine | Red-brown needles | Brilliant red. |
| 5 | Para-toluidine | Red-brown needles | Bluish red. |
| 6 | Meta-chloraniline | Orange-red needles | Red-orange. |
| 7 | Para-chloraniline | Red-brown needles | Orange. |
| 8 | 2.4-dichloraniline | Yellow needles | Golden yellow. |
| 9 | 2.5-dichloraniline | Fine red-brown needles | Golden yellow. |
| 10 | 3.4-dichloraniline | Orange needles | Red-orange. |
| 11 | 3.5-dichloraniline | Orange-brown needles | Golden orange. |
| 12 | 2.3.4-trichloraniline | Orange leaflets | Golden orange. |
| 13 | 3.4.5-trichloraniline | Fine yellow needles | Golden yellow. |
| 14 | 2-chlor-6-toluidine | Yellow-brown leaflets | Yellow. |
| 15 | Ortho-anisidine | Red needles | Orange. |
| 16 | Para-anisidine | Red-brown needles | Bluish red. |
| 17 | 1-aminonaphthalene | Orange needles | Yellow-brown. |
| 18 | 2-aminonaphthalene | Bluish red needles | Orange-red. |
| 19 | 1-chlor-2-aminonaphthalene | Red needles | Red-orange. |
| 20 | Para-phenylenediamine | Blue-violet needles | Violet. |
| 21 | 1-aminoanthraquinone | Red-orange needles | Red-orange. |
| 22 | 1-amino-4-methoxyanthraquinone. | Bluish red needles | Wine-red. |
| 23 | 2-aminoanthraquinone | Orange needles | Orange. |
| 24 | 1-chlor-2-aminoanthraquinone. | Yellow needles | Golden yellow. |
| 25 | 1.4-diaminoanthraquinone | Violet needles | Red-violet. |
| 26 | 4.8-diaminoanthrarufin | Blue needles | Blue. |
| 27 | 1.5-diaminoanthraquinone | Red needles | Yellow-red. |
| 28 | 1-amino-4-benzoylaminoanthraquinone. | Bluish red needles | Wine-red. |
| 29 | 1-amino-5-benzoylaminoanthraquinone. | Orange needles | Red-orange. |
| 30 | Cyclohexylamine | Yellow-red needles | Yellow-red. |
| 31 | 8-aminoquinoline | Yellow-brown needles | Yellow-brown. |
| 32 | Methylaniline | Red-brown needles | Red. |
| 33 | 1-methylaminoanthraquinone. | Orange needles | Orange. |
| 34 | Piperidine | Red-brown needles | Rose. |
| 35 | Pyrazolanthrone | Orange-red needles | Orange-brown. |

*Example 2*

A mixture of 10 parts of Pz-dihydroxy-1.2-pyrazinoanthraquinone, 10 parts of anhydrous boric acid and 100 parts of para-chloraniline is heated to boiling for about an hour. The liquid, which was originally yellow-brown, thereby slowly becomes brown-red. If it is diluted after cooling with about 100 parts of alcohol, orange-brown needles separate out which agree in their properties and dyeing with the dyestuff obtained from Pz-chlorhydroxy-1.2-pyrazinoanthraquinone and para-chloraniline according to Example 1 (No. 7 in the list).

If instead of para-chloraniline, similar amino compounds be employed, dyestuffs are obtained which agree with those obtained from the corresponding amines in the manner described in Example 1.

*Example 3*

A mixture of 10 parts of Pz-dihydroxy-1.2-pyrazinoanthraquinone, 10 parts of anhydrous boric acid, 35 parts of aniline and 100 parts of diphenyl ether is heated to boiling for some hours and is then diluted with alcohol while still warm to such an extent that the resulting compound crystallizes upon cooling. The dyestuff thus obtained agrees with that obtainable according to Example 1.

*Example 4*

A mixture of 3.2 parts of 2.3-dihydroxyquinoxaline, 4.4 parts of 1-aminoanthraquinone, 30 parts of phosphorus oxychloride and 75 parts of nitrobenzene is heated at 100° C. for half an hour and then boiled for about an hour. After cooling, it is diluted with alcohol. The precipitated substance is filtered off by suction, and washed with alcohol and dilute caustic soda solution. It is olive-yellow and crystallizes from nitrobenzene in orange needles. It dissolves to give the same color in concentrated sulphuric acid and dyes cotton salmon shades of good fastness properties from a red vat.

*Example 5*

A mixture of 10 parts of Pz-dihydroxy-1.2-pyrazinoanthraquinone, 10 parts of anhydrous sodium bisulphate and 100 parts of aniline is heated to boiling until a sample withdrawn and diluted with alcohol deposits brown crystals. The mixture is then allowed to cool, alcohol is added and the dyestuff is filtered off by suction, washed with alcohol and water and dried. It agrees with the dyestuff described in Example 1. Anhydrous copper sulphate or zinc chloride may be used instead of sodium bisulphate.

*Example 6*

A mixture of 3.6 parts of 2-chlor-3-hydroxyquinoxaline which forms white needles having a decomposition point of 267° C. from nitrobenzene (obtainable by heating 2.3-dihydroxyquinoxaline with phosphorus oxychloride), 5 parts of 1-aminoanthraquinone and 100 parts of nitrobenzene is heated to boiling until the amount of separated dyestuff no longer increases. After cooling, it is filtered off by suction and washed with benzene. It agrees with the dyestuff obtained in Example 4.

If 2-aminoanthraquinone be used instead of 1-aminoanthraquinone, a dyestuff is obtained which dyes cotton yellow shades from a red vat.

*Example 7*

A mixture of 10 parts of 3-brom-Pz-chlorhydroxy-1.2-pyrazinoanthraquinone which may be prepared in a manner similar to that described in Example 1 for the preparation of Pz-chlorhydroxy-1.2-pyrazinoanthraquinone and 10 parts of 3.5-bis-trifluormethylaniline is heated to boiling for 1 hour in 200 parts of nitrobenzene, the new dyestuff separating with an evolution of hydrogenchloride. After working up according to Example 1 it is obtained in the form of orange needles which dye cotton yellow shades of excellent fastness properties.

Dyestuffs having similar tinctorial properties are obtained by using instead of 3-brom-Pz-chlorhydroxy-1.2-pyrazinoanthraquinone 3-chlor- or 3-methoxy-Pz-chlorhydroxy-1.2-pyrazinoanthraquinone.

Dyestuffs having a similar shade of color results if 3.5-bis-trifluormethylaniline be replaced by 2-chlor-5-trifluormethylaniline or by 4-chlor-6-trifluormethylaniline.

It is also possible to work in the following manner:

A mixture of 10 parts of Pz-chlorhydroxy-1.2-pyrazinoanthraquinone, 10 parts of 3.5-bis-trifluormethylaniline and 200 parts of nitrobenzene is heated to boiling for 1 hour, the resulting dyestuff separating with an evolution of hydrogen chloride. After working up in the manner described in Example 1, yellow needles are obtained which dye cotton yellow shades of excellent fastness properties.

If 3.5-bis-trifluormethylaniline be replaced by other amines having trifluormethyl groups dyestuffs of a corresponding composition are obtained. The main properties of some of these dyestuffs may be seen from the following list:

| No. | Amine employed | Shade and form of the crystalline dyestuff | Dyeing |
|---|---|---|---|
| 1 | 3-trifluormethylaniline | Yellow-red needles | Reddish orange. |
| 2 | 4-trifluormethylaniline | Yellow-red laminae | Golden-yellow. |
| 3 | 2-chlor-5-trifluormethylaniline | Orange needles | Golden-orange. |
| 4 | 4-chlor-3-trifluormethylaniline | Orange laminae | Golden-orange. |
| 5 | 4-chlor-6-trifluormethylaniline | Yellow needles | Greenish yellow. |
| 6 | 2-methoxy-5-trifluormethylaniline | Orange needles | Golden-orange. |
| 7 | 2-chlor-4.5-bis-trifluormethylaniline | Yellow laminae | Golden-yellow. |
| 8 | 2.4-dimethoxy-5-trifluormethylaniline | Red needles. | Yellow-red. |
| 9 | 3-trifluormethyl-4-methyl-sulphoaniline | Yellow laminae | Greenish yellow. |
| 10 | 1.4-diamino-2.6-bis-trifluormethylbenzene. | Red needles | Yellowish red. |
| 11 | 2.2'-diamino-4.4'-bis-trifluormethyldiphenyl. | Reddish yellow needles | Golden-yellow. |
| 12 | 4-amino-3-trifluormethyl-diphenyl ether. | Yellow laminae | Orange. |

If instead of Pz-chlorhydroxy-1.2-pyrazinoanthraquinone 3-brom-Pz-chlorhydroxy-1.2-pyrazinoanthraquinone or 3-chlor- or 3-methoxy-Pz-chlorhydroxy-1.2-pyrazinoanthraquinone be used dyestuffs having similar tinctorial properties are obtained.

*Example 8*

A mixture of 10 parts of Pz-dihydroxy-2.3-pyrazinoanthraquinone (prepared, for example, by the condensation of 2.3-diaminoanthraquinone with oxalic acid) and 100 parts of nitrobenzene is heated at from 180° to 190° C. and while keeping this mixture at this temperature for some hours there are added 10 parts of m-toluidine and 2 parts of zinc chloride. After cooling the resulting product is filtered off by suction, washed with benzene and alcohol, whereupon any initial material which may still be present in the reaction product is removed by extraction with aqueous piperidine. By recrystallization from nitrobenzene the dyestuff is obtained in the form of red needles. It dyes cotton red shades from a green vat.

Similar dyestuffs may be obtained by employing Pz-dihydroxy- or Pz-halogenhydroxy-1.2- or 2.3-pyrazinoanthraquinones substituted in one or more of the positions 5, 6, 7 and 8 of the anthraquinone nucleus, as for example 6- or 7-chlor-, 6- or 7-methyl-, 6- or 7-methoxy-, or 5.8-dichlor-Pz-dihydroxy or Pz-chlorhydroxy-1.2- or 2.3-pyrazinoanthraquinone. Pyrazino compounds of this type are obtained for example when starting from the correspondingly substituted phthalic anhydrides, by condensation with chlor- or brombenzene to form the correspondingly substituted 4-halogen-aroylbenzoic acids, nitration in ortho-position to the halogen atom, exchange of the halogen atom in known manner by the amino group, subsequent reduction of the nitro group to the amino group and condensation of the diamino-aroylbenzoic acid by means of oxalic acid and ring closure to the anthraquinone. Thus the two possible isomeric Pz-dihydroxypyrazinoanthraquinones having the pyrazine ring in 1.2- or 2.3-position are in general obtained which if desired may be separated from each other for example by the different solubilities of their sulphates in moderately diluted sulphuric acid. By reacting with amines these two Pz-dihydroxy-pyrazino-derivatives or the Pz-halogenhydroxy compounds obtained therefrom yield dyestuffs, which are in general similar to those described in Example 1 or 8.

*Example 9*

A mixture of 3.1 parts of Pz-chlorhydroxy-1.2-pyrazinoanthraquinone, 1.7 parts of para-amino-diphenyl and 30 parts of nitrobenzene is heated to boiling for some time until hydrochloric acid is no longer evolved. After cooling the reaction mixture the condensation product separates in the form of red needles. It is worked up according to Example 1, a vat dyestuff thus being obtained which dyes cotton bluish red shades from a brown vat.

If instead of para-aminodiphenyl m-aminodiphenyl is used a condensation product is obtained which crystallizes in the form of red needles and dyes cotton brilliant yellow-red shades.

If 2-amino-fluorene be employed ruby-red needles are obtained which dye cotton giving an intense wine-red shade whereas the use of 4-aminofluorene leads to the formation of orange needles forming a vat dyestuff which dyes cotton brilliant red-orange shades.

Also when using 2-amino-diphenylene oxide as the amine component a condensation product is obtained which forms red-brown needles and dyes cotton yellow-red shades from a brown vat.

*Example 10*

A mixture of 6.2 parts of Pz-chlorhydroxy-1.2-pyrazinoanthraquinone, 1.9 parts of 3.3'-diaminodiphenyl and 18 parts of nitrobenzene is heated to boiling until the formation of the dyestuff is completed. The resulting brown-red needles are filtered off by suction while still warm, washed with alcohol and dried. The dyestuff which is thus obtained in a good yield dyes cotton strong red-brown shades from the vat. If the said diamino compound be replaced by other aromatic diamino compounds dyestuffs having a similar composition are obtained as set forth by way of example in the following table:

marane and 30 parts of nitrobenzene is heated to boiling until hydrogen chloride no longer escapes. After cooling the reaction mixture the dye-stuff separated is obtained as described in Example 1. It forms a violet powder and dyes cotton red-violet shades from a brown vat.

| No. | Amino compound employed | Shade and form of the crystallized dyestuff | Dyeing |
|---|---|---|---|
| 1 | Meta-phenylenediamine | Red needles | Red-brown. |
| 2 | Meta-toluylenediamine | Brown-violet needles | Red-brown. |
| 3 | 2.5 - dichlor - meta - phenylene - diamine. | Brown-red needles | Orange. |
| 4 | Para-phenylenediamine | Violet needles | Violet. |
| 5 | Para-toluylenediamine | Blue-violet needles | Violet. |
| 6 | 4.4'-diaminodiphenyl | Violet needles | Currant. |
| 7 | 2.4'-diaminodiphenyl | Red needles | Red-brown. |
| 8 | 3.3' - dimethyl - 4.4' - diamino - diphenyl. | Violet needles | Currant. |
| 9 | 2.2' - dimethyl - 4.4' - diamino - diphenyl. | Bluish red laminae | Bluish red. |
| 10 | 2.2' - dichlor - 3.3' - dimethyl - 4.4' - diaminodiphenyl. | Orange needles | Orange. |
| 11 | 6.6' - dichlor - 3.3' - dimethyl - 4.4' - diaminodiphenyl. | Orange laminae | Orange. |
| 12 | 2.2'-dichlor-4.4' diaminodiphenyl | Carmine-red needles | Orange-red. |
| 13 | 3.3'-dichlor-4.4'-diaminodiphenyl | Yellow-red needles | Red-brown. |
| 14 | 2.2' - dimethyl - 6.6' - diaminodiphenyl. | Yellow-red laminae | Orange. |
| 15 | 4.4' - dimethyl - 2.2' - diaminodiphenyl. | Orange needles | Orange. |
| 16 | 3.3'-diamino-azoxybenzene | Red-brown laminae | Brown-orange. |
| 17 | 3.3'-diaminodiphenyl | Brown-red needles | Copper-red. |
| 18 | 4.4'-diamino-diphenyl ether | Brown-violet needles | Brown-red. |
| 19 | 3.3'-diaminodiphenyl-methane | Red needles | Yellow-red. |
| 20 | 3.4' - diaminophenylazimino - benzene. | Orange-brown needles | Red-orange. |
| 21 | 3.4'-dichlor-2-aminodiphenyl ether | Orange needles | Golden-yellow. |

If the diamines referred to in the above list are condensed, instead of with Pz-chlorhydroxy-1.2-pyrazinoanthraquinone, with 3-brom-, 3-chlor- or 3-methoxy-Pz-chlorhydroxy-1.2-pyrazinoanthraquinone, dyestuffs are obtained which are similar to the corresponding dyestuffs set out in the above list as to shades of color and tinctorial properties.

*Example 11*

A mixture of 3.1 parts of Pz-chlorhydroxy-1.2-pyrazinoanthraquinone, 1.8 parts of Pz-cyclohexylaniline and 35 parts of nitrobenzene is heated to boiling until hydrogen chloride no longer escapes. After cooling down to room temperature the condensation product which has separated out in the form of bluish red laminae is filtered off by suction and worked up in the usual manner. The dyestuff thus obtained dyes cotton very strong and brilliant red shades from the vat.

If, instead of para-cyclohexylaniline, employed an equal amount of meta-cyclohexylaniline be used a yellowish red dyestuff is obtained. By using ortho-cyclohexylaniline, a red vat dyestuff is formed.

Dyestuffs having similar properties are obtained by employing as amino components equivalent amounts of 5- or 6-amino-1.2.3.4-tetrahydronaphthalene.

*Example 12*

A mixture of 3.1 parts of Pz-chlorhydroxy-1.2-pyrazinoanthraquinone, 1.4 parts of 5-aminocoumarane and 30 parts of nitrobenzene is heated to boiling until hydrogen chloride no longer escapes. After cooling the reaction mixture the dye-stuff separated is obtained as described in Example 1. It forms a violet powder and dyes cotton red-violet shades from a brown vat.

When using instead of 5-aminocoumarane an equivalent amount of 2-methyl-5-aminocoumarane, 2-methyl-5-amino-7-methoxycoumarane or 2.7-dimethyl-5-aminocoumarane dyestuffs having from red-violet to blue-violet shades are obtained; when using 2-methyl-7-aminocoumarane a product is obtained which dyes cotton strong orange shades.

*Example 13*

A mixture of 3.1 parts of Pz-chlorhydroxy-1.2-pyrazinoanthraquinone, 1.4 parts of 3-aminoacetophenone and 30 parts of nitrobenzene is heated until the formation of the dyestuff is completed, whereupon it is worked up as described in Exple 1. An orange crystal powder is thus obtained which dyes cotton brilliant orange shades from a brown vat.

When using instead of 3-aminoacetophenone corresponding amounts of other aminoarylketones valuable dyestuffs are likewise obtained. The main characteristics of some of those dyestuffs are set out in the following list:

| No. | Amine employed | Shade and form of the crystallized dyestuff | Dyeing |
|---|---|---|---|
| 1 | 4-aminobenzophenone | Orange needles | Golden-orange. |
| 2 | 4-amino-2-chlorbenzophenone | Yellow laminae | Golden-orange. |
| 3 | 4 - amino - 2 - chlor - 4' - methyl - benzophenone. | Yellow laminae | Golden-yellow. |
| 4 | 4-amino-2.4'-dichlorbenzophenone | Orange laminae | Golden-orange. |
| 5 | 2-amino-4.5-dimethylbenzophenone | Red laminae | Bluish-red. |
| 6 | 3.3'-diaminobenzophenone | Red laminae | Yellow-red. |
| 7 | 4.4'-diaminobenzophenone | Orange needles | Reddish orange. |
| 8 | 4.4' - diamino - 3.3' - dimethylbenzophenone. | Orange laminae | Orange. |

If the amines referred to in the above list are reacted, instead of with Pz-chlorhydroxy-1.2-pyrazinoanthraquinone, with 3-brom-, 3-chlor- or 3-methoxy-Pz-chlorhydroxy-1.2-pyrazinoanthraquinone, dyestuffs having similar properties are obtained.

*Example 14*

A mixture of 3.1 parts of Pz-chlorhydroxy-1.2-Pz-pyrazinoanthraquinone, 1.4 parts of 3-amino- 6-chlor-pyridine and 25 parts of nitrobenzene is heated to boiling for a short time. After cooling the reaction mixture is worked up as described in Example 1. The resulting dyestuff forms red-brown needles which dye cotton reddish orange shades from a brown vat.

If instead of 3-amino-6-chlor-pyridine an equivalent amount of 3.5-diaminopyridine be employed a yellow-brown dyestuff is obtained.

*Example 15*

The para-toluenesulphamino compound which may be prepared in the usual manner from 3-amino-1.2-benzanthraquinone is nitrated and the 4-nitro-3-amino-1.2-benzanthraquinone obtained after the saponification of the nitration product is reduced to 3.4-diamino-1.2-benzanthraquinone. By heating the latter with oxalic acid at 160° C. Pz-dihydroxy-1.2-benzo-3.4-pyrazinoanthraquinone is obtained in the form of red needles which melt above 360° C. and dissolve in sulphuric acid giving a brown coloration.

A mixture of 3 parts of the compound thus obtained, 9 parts of meta-toluidine, 0.6 part of zinc chloride and 30 parts of nitrobenzene is heated to boiling for 1 hour. The reaction mass is worked up as described in Example 8. The dyestuff thus obtained forms a dark violet powder which dyes cotton fast reddish blue shades from a brown vat.

*Example 16*

1.2.3.4-triaminoanthraquinone is heated with oxalic acid and the Pz-dihydroxy-1.2-pyrazinoanthraquinone-4-oxamine acid formed is saponified by heating with sulphuric acid. 5 parts of the 4-amino-Pz-dihydroxy-1.2-pyrazinoanthraquinone thus obtained forming a dark violet powder which is soluble in concentrated sulphuric acid with a brown coloration, 3 parts of dehydrated boric acid and 50 parts of aniline are boiled until the formation of dyestuffs is completed. After cooling the red-violet needles separated are filtered off by suction and worked up in the usual manner. The dyestuff dissolves with difficulty in organic solvents giving a red-violet shade, readily in concentrated sulphuric acid giving a green coloration. It dyes cotton fast red-violet shades from a red-brown vat.

What we claim is:

1. A vat dyestuff of the pyrazine series corresponding to the general formula

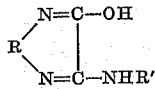

wherein R represents the radical of an aromatic compound having up to three condensed isocylic nuclei combined in two adjacent positions with the nitrogen atoms of the pyrazino ring shown, and R' an organic radical, at least one of the radicals R and R' being para-quinoid and capable of being vatted.

2. A vat dyestuff of the pyrazine series corresponding to the general formula

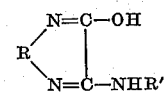

wherein R represents the radical of an aromatic compound having up to three condensed isocylic nuclei combined in two adjacent positions with the nitrogen atoms of the pyrazino ring shown, and R' an aromatic radical, at least one of the radicals R and R' being para-quinoid and capable of being vatted.

3. A vat dyestuff of the pyrazine series corresponding to the general formula

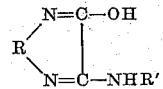

wherein R represents the radical of an anthraquinone combined in two adjacent positions with the nitrogen atoms of the pyrazino ring shown, and R' an aromatic radical, at least one of the radicals R and R' being capable of being vatted.

4. A vat dyestuff of the pyrazine series corresponding to the general formula

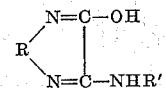

wherein R represents the radical of an anthraquinone combined in the 1- and 2-positions with the nitrogen atoms of the pyrazino ring shown, and R' an aromatic radical, at least one of the radicals R and R' being capable of being vatted.

5. A vat dyestuff of the pyrazine series corresponding to the general formula

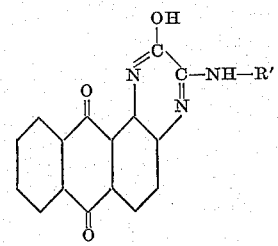

wherein R' stands for a radical of the benzene series.

6. A vat dyestuff of the pyrazine series corresponding to the general formula

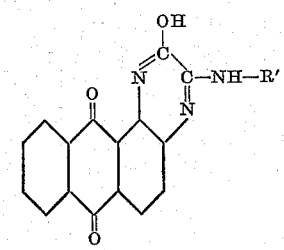

wherein R' stands for a radical of the benzene series containing halogen.

7. A vat dyestuff of the pyrazine series corresponding to the general formula

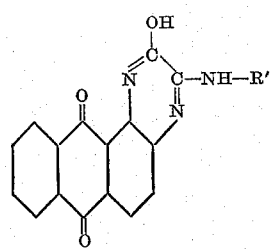

wherein R' stands for a radical of the benzene series containing an alkyl group.

8. The vat dyestuff of the pyrazine series corresponding to the formula
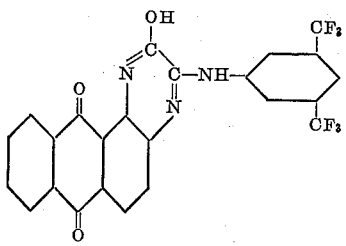
9. The vat dyestuff of the pyrazine series corresponding to the formula
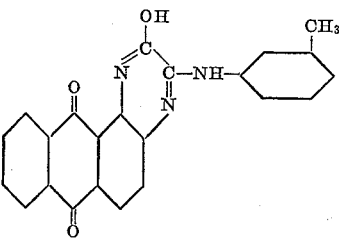
10. The vat dyestuff of the pyrazine series corresponding to the formula
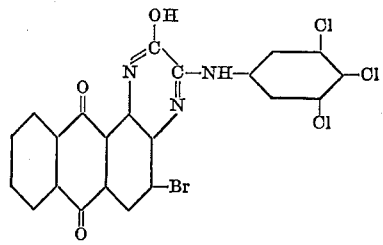
HEINRICH NERESHEIMER.
WILHELM RUPPEL.
WILLY EICHHOLZ.